US008041225B2

(12) United States Patent
Hemmelmann et al.

(10) Patent No.: US 8,041,225 B2
(45) Date of Patent: Oct. 18, 2011

(54) CONTACTLESS INFRARED DATA TRANSMISSION FOR WIND TURBINES

(75) Inventors: Jan Erich Hemmelmann, Munich (DE); Stefan Brandhoff, Haag an der Amper (DE); Alexander Felix Fiseni, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/642,981

(22) Filed: Dec. 21, 2009

(65) Prior Publication Data

US 2011/0150497 A1 Jun. 23, 2011

(51) Int. Cl.
*H04B 10/00* (2006.01)
*F03D 9/00* (2006.01)

(52) U.S. Cl. .......... 398/118; 398/130; 398/140; 290/44; 250/231.13; 250/208.2; 385/26

(58) Field of Classification Search .......... 398/106–109, 398/114, 118–120, 126–131; 310/68; 250/231.13, 250/208, 551; 307/10.1; 290/44; 385/26
See application file for complete search history.

(56) References Cited

U.S. PATENT DOCUMENTS

| | | | | |
|---|---|---|---|---|
| 5,828,146 | A * | 10/1998 | Lorenz et al. | 310/68 D |
| 6,031,949 | A * | 2/2000 | Davies | 385/26 |
| 6,643,519 | B1 * | 11/2003 | Lundgren | 455/505 |
| 7,218,012 | B1 * | 5/2007 | Edenfeld | 290/44 |
| 2004/0012471 | A1 * | 1/2004 | Kojima et al. | 336/120 |
| 2005/0226636 | A1 * | 10/2005 | Hiramatsu et al. | 398/182 |
| 2007/0069116 | A1 * | 3/2007 | Koitabashi | 250/231.13 |
| 2008/0147240 | A1 | 6/2008 | Hudock et al. | |
| 2009/0155280 | A1 * | 6/2009 | Jordan et al. | 424/139.1 |
| 2010/0127158 | A1 * | 5/2010 | Scheiber et al. | 250/208.1 |
| 2010/0148505 | A1 * | 6/2010 | Dunlap et al. | 290/44 |
| 2010/0295304 | A1 * | 11/2010 | Rowan et al. | 290/44 |

FOREIGN PATENT DOCUMENTS

| | | | |
|---|---|---|---|
| JP | 5151491 A | | 6/1993 |
| JP | 11182135 A | | 7/1999 |
| JP | 2002-026589 | * | 1/2002 |
| JP | 2002026589 A | | 1/2002 |
| JP | 2003168184 A | | 6/2003 |
| WO | WO2009008863 | * | 1/2009 |

OTHER PUBLICATIONS

JP5151491 (A) English Abstract.
JP11182135 (A) English Abstract.
JP2002026589 (A) English Abstract.
JP2003168184 (A) English Abstract.

* cited by examiner

*Primary Examiner* — Li Liu
(74) *Attorney, Agent, or Firm* — Ann M. Agosti

(57) ABSTRACT

An apparatus for enabling transmission of signals and data via means of infrared (IR) light for a wind turbine includes a plurality of IR data communication elements configured to provide unidirectional and bidirectional IR data exchange between non-rotating portions of the wind turbine and the rotatable wind turbine hub.

19 Claims, 3 Drawing Sheets

CONTACTLESS INFRARED DATA TRANSMISSION FOR WIND TURBINES

BACKGROUND

This invention relates generally to wind turbines, and more particularly to methods and apparatus for enabling transmission of data and signals between non-rotating portions of a wind turbine nacelle and a rotating hub.

A conventional slipring is generally used to transmit discrete low voltage signals and to accommodate communication bus protocols between the stationary and rotational parts of a wind turbine. Sliprings are also used to transfer AC or DC power. Sliprings are based on a physical connection between the stationary and rotary structures, accomplished through electrically conductive sliding elements that are subject to wear-out, limiting the design life and reliability of the sliprings.

Other techniques for enabling transmission of data between non-rotating portions of a wind turbine nacelle and a rotating hub may include use of fiber optic rotary joints, or use of wireless transmission, GSM mobile transmission, inductive coupling(s), or capacitive coupling(s).

It would be advantageous to provide methods and apparatus for enabling transmission of data and signals between non-rotating portions of a wind turbine nacelle and the rotating hub that are less expensive to manufacture or otherwise employ while achieving equal or greater reliability than methods and apparatus that require the use of fiber optic rotary joints, wireless transmission, GSM mobile transmission, inductive coupling(s), or capacitive coupling(s).

BRIEF DESCRIPTION

According to one embodiment, an apparatus for enabling transmission of signals and data via a means of infrared (IR) light for a wind turbine comprises a plurality of IR data communication elements configured to provide unidirectional or bidirectional IR data and signal exchange between a non-rotating portion of a wind turbine and a rotatable wind turbine hub in response to rotation of a rotating portion of the wind turbine.

DRAWINGS

Figure 1:
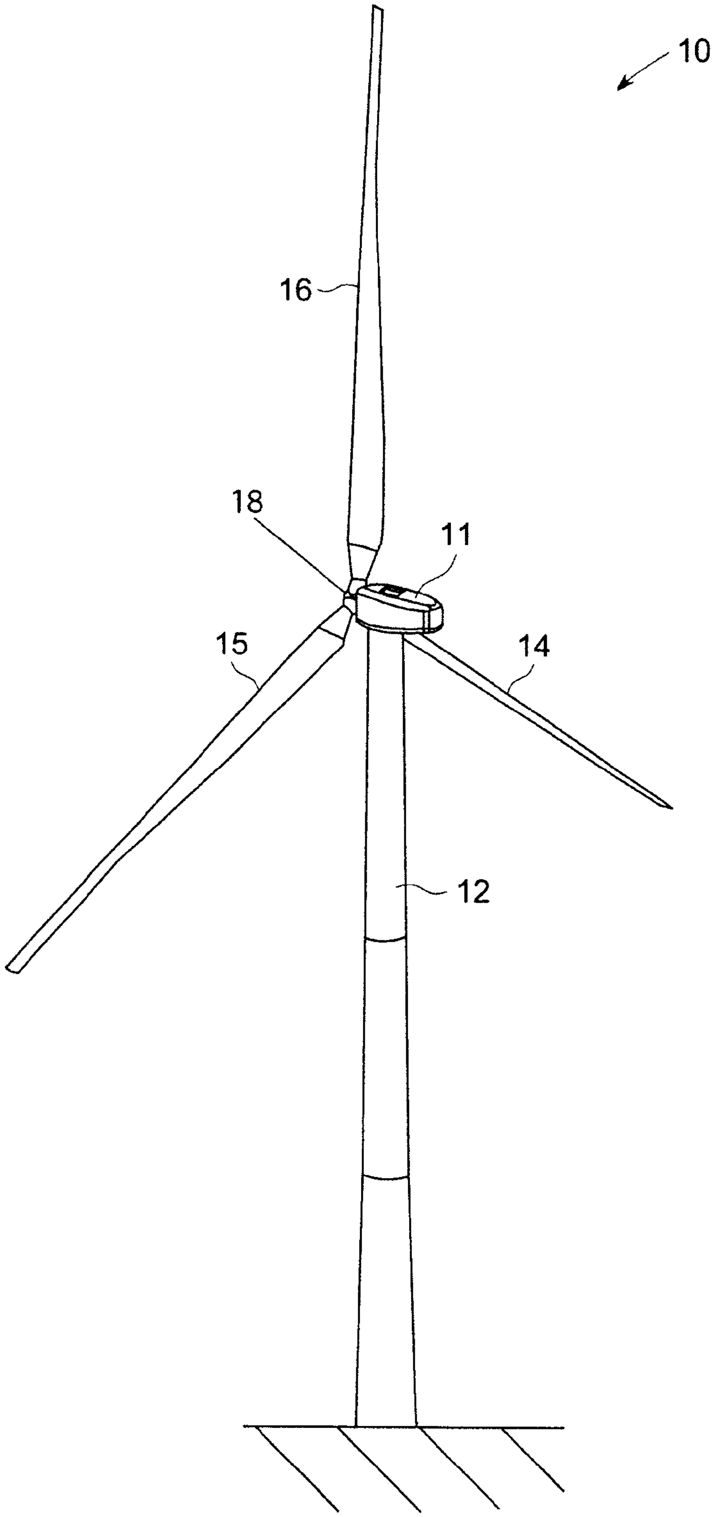
Figure 2:
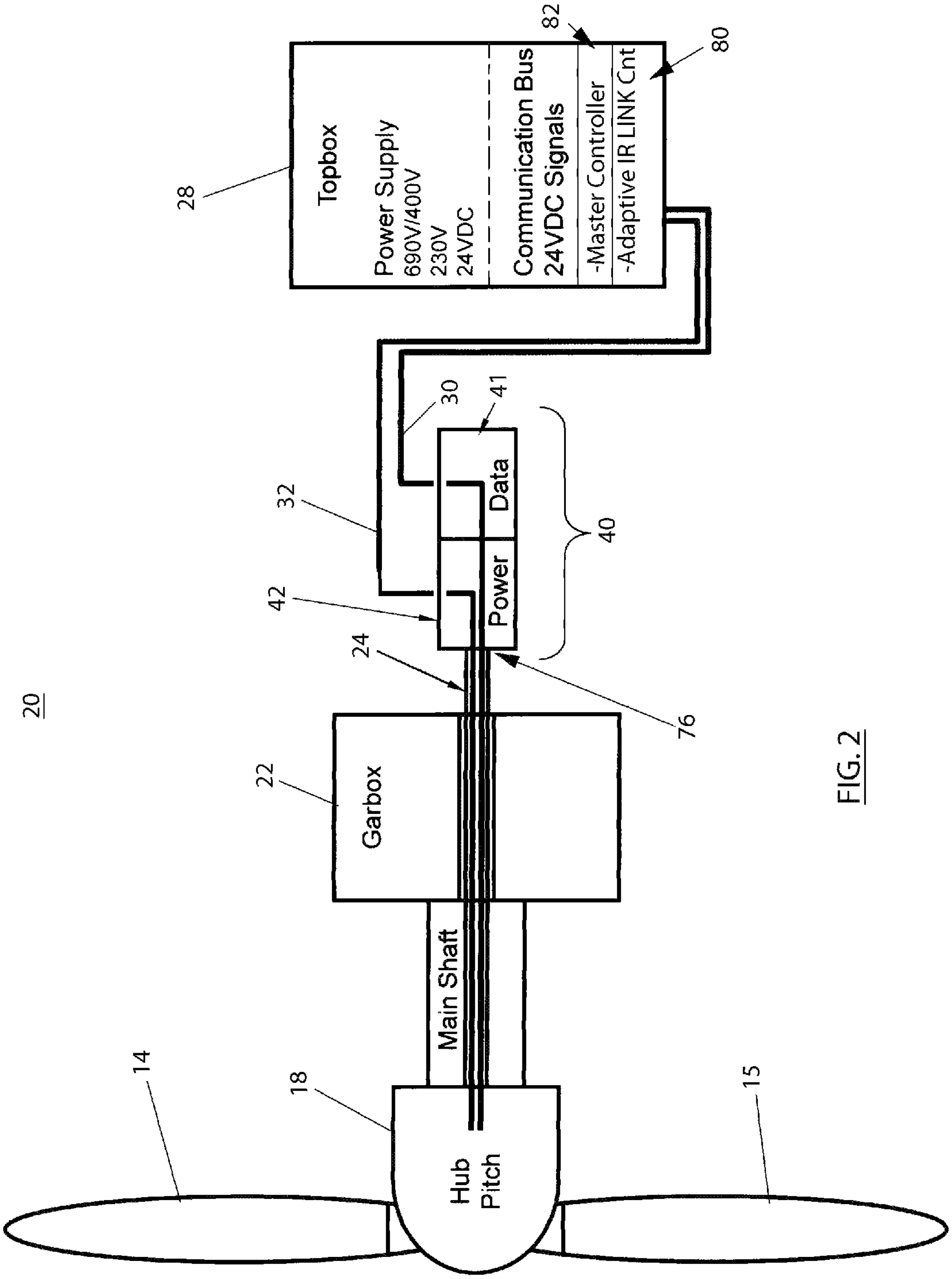
Figure 3:
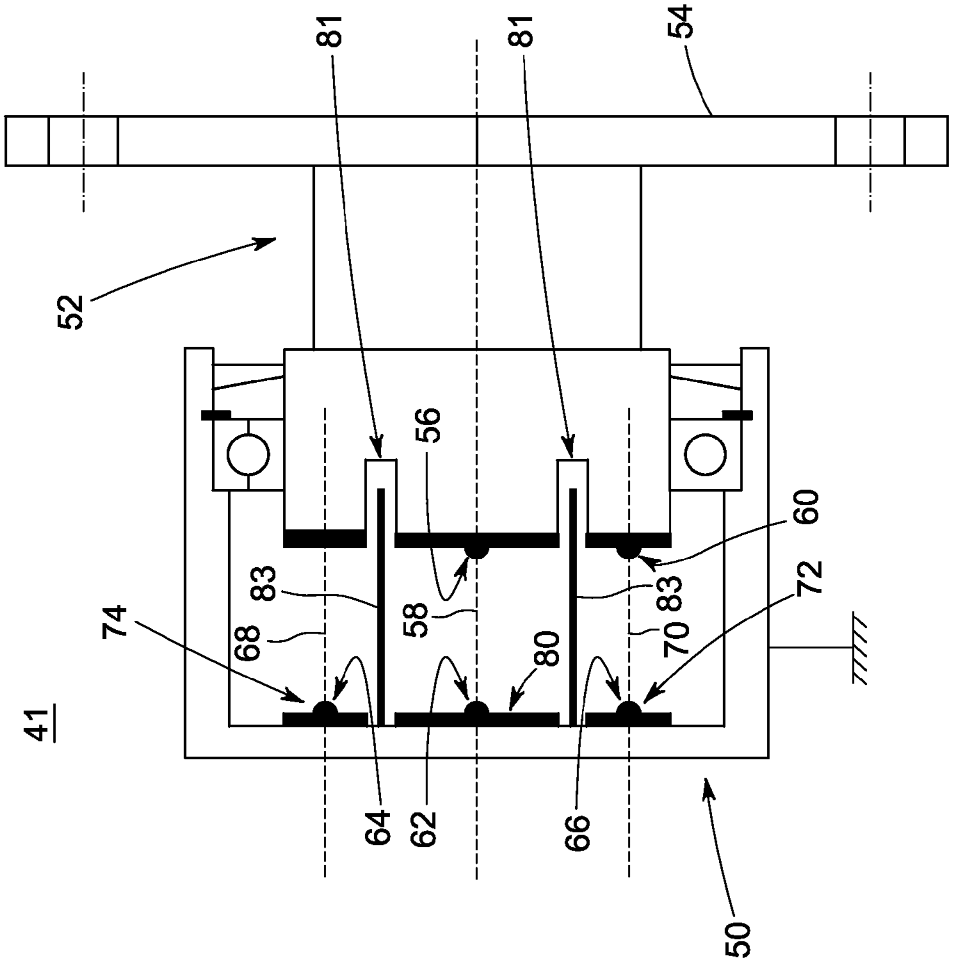

These and other features, aspects, and advantages of the present invention will become better understood when the following detailed description is read with reference to the accompanying drawings in which like characters represent like parts throughout the drawings, wherein:

FIG. 1 illustrates a wind turbine in which embodiments of the invention are integrated therein;

FIG. 2 is a simplified block diagram illustrating components in a wind turbine nacelle and hub for power and data communication systems in which embodiments of the invention are integrated therein; and FIG. 3 illustrates a more detailed view of the rotary joint portion of the wind turbine signal and data communication system depicted in FIG. 2, showing infrared (IR) data communication elements according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

In some configurations and referring to FIG. 1, a wind turbine 10 comprises a nacelle 11 housing a generator. Nacelle 11 is mounted atop a tall tower 12. Wind turbine 10 also comprises a rotor that includes one or more rotor blades 14, 15, 16 attached to a rotating hub 18. Although wind turbine 10 illustrated in FIG. 1 includes three rotor blades 14, 15, 16, there are no specific limits on the number of rotor blades required by the embodiments described herein.

In some configurations, various components are housed in nacelle 11 atop tower 12 of wind turbine 10. The height of tower 12 is selected based upon factors and conditions known in the art. In some configurations, one or more controllers including algorithmic software are used for wind-speed monitoring and turbine control and may be based on distributed or centralized control architectures.

In some configurations, one or more variable blade pitch drive actuators are provided to control the pitch of blades 14, 15, 16. In some configurations, the pitches of blades 14, 15, 16 are individually controlled by the blade pitch actuators.

The drive train of the wind turbine includes a main rotor shaft (also referred to as a "low speed shaft") connected to the hub 18 via a main bearing and (in some configurations), at an opposite end of the rotor shaft to a gear box enumerated 22 in FIG. 2. The gear box 22, in some configurations, utilizes dual path geometry to drive an enclosed high speed shaft. In other configurations, the main rotor shaft is coupled directly to a generator. The high speed shaft is used to drive the generator.

FIG. 2 illustrates a wind turbine data communication system 20 in which embodiments of the invention described below with reference to FIG. 3, are integrated therein. A pitch tube 24 is configured to rotate in coordination with the rotor hub 18 that rotates in response to wind contacting the rotor blades 14-16. The pitch tube 24 can be seen to pass through a gearbox 22 on its way to one or more rotary joints 40 that include a data or signal rotary joint 41 and a power rotary joint 42. The embodiments described herein relate only to data or signal transmission via means of infrared light and not to power transmission, and so apply only to the data or signal rotary joint portion of the rotary joints 40. The data/signal rotary joint 41 is configured to assist communication of data and signals between the rotor hub 18 and a topbox 28 that includes one or more low voltage data communication buses 30. Electrical power is transmitted via one or more power supply buses 32 while data communication signals are transmitted via one or more low voltage data communication buses 30.

More specifically, the pitch tube 24 is fixed to the hub 18, and the hub 18 is being rotated by the wind turbine blades 14, 15, 16, which are fixed to the hub 18. Pitch tube 24 is a commonly used term in wind industry for the pipe which guides the electrical cables from the hub 18 through the gearbox 22, where finally the slipring (or rotary joint(s)) 40 is mounted. The apparatus may or may not be connected to a pitch tube 24, and alternatively it is connected with the main shaft, or even directly with the hub 18. Important is only, that it is connected with a rotating element being part of the so-called hub 18 and being rotated with the same speed as the hub 18.

FIG. 3 illustrates a more detailed view of the data/signal rotary joint portion 41 of the wind turbine data communication system 20 depicted in FIG. 2, and shows infrared (IR) data communication elements 56, 60, 62, 64, 66 according to one embodiment. More specifically, embodied rotary joint portion 41 includes a stationary section 50 where the data/signal bus 30 from the topbox 28 is connected. Rotary joint portion 41 further includes a rotating section 52 that is fixed to the rotatable pitch tube 24 via a flange 54. The present invention is not so limited however, and it can be appreciated that the IR joint does not necessarily need to be attached to the rotary power transmission element. The IR joint could, for example, be directly coupled to the pitch tube, in which case the rotary power transmission element(s) will be disposed behind the IR joint; or the IR joint could be coupled to the rotary power transmission element(s).

Rotary joint portion 41 includes a transmitter IR diode 56 disposed on the central axis 58 of rotating section 52. At least one receiver IR diode 60 is disposed near an outer periphery of rotating section 52. Embodied stationary section 50 includes a receiver diode 62 disposed on the central axis 58 of the rotating section and configured to receive IR data signals transmitted via transmitter IR diode 56. One or more transmitter diodes 64, 66 are also disposed on stationary section 50. Each stationary section transmitter diode 64, 66 is configured to transmit a data IR signal in the direction of a corresponding signal transmission axis 68, 70. Each rotating section receiver IR diode 60 is configured to receive the IR data signals transmitted via the stationary section transmitter diodes 64, 66 along the corresponding signal transmission axes 68, 70. In this manner, bi-directional IR data transmission and reception takes place between the stationary section (s) 50 that forms a non-rotating portion of a wind turbine nacelle 11 according to one embodiment and a rotatable wind turbine hub 18 or corresponding pitch tube 24. The rotating section 52 can be seen to include one or more slots 81 configured to receive one or more diode separator elements 83 extending from the stationary section 50 toward the rotating section 52.

In summary explanation, an apparatus and method have been described for transmission of data between the non-rotating part of a wind turbine nacelle 11 and a rotating hub 18. The data transmission is achieved via infrared light, such as set forth according to well known communication standard IrDA-1.1. Standard components for infrared light emission and detection can be utilized for data transmission in wind turbines, where slip rings are conventionally used to achieve data transmission. The IR data transmission is achieved at the back end of the pitch tube 24 according to one embodiment so that at least one IR transmitter 56 and corresponding receiver 62 can be axially aligned with the central axis 58 of the pitch tube 24. Infrared diodes 64, 66, 60 are placed on a similar radius around the rotating axis 58, so that the diodes can see one another. These IR diodes radiate light with a certain opening angle of radiation, and there can be several diodes across the corresponding circumference, so rotation changes the corresponding diode communication with respect to time. Some misalignment or angular displacement between IR diodes 66 and 60 can be tolerated while achieving the desired data or signal transmission. The pitch tube 24 rotates with the rotor and hub 18 of the wind turbine 10 and provides a means for providing the hub 18 with electrical power and data communication signals. The continuous communication between a master controller unit 82 (PLC located inside the top box 28) and a slave unit pitch controller (typically located inside the hub 18) runs over a bi-direction and full-duplex network.

The use of IR technology provides a lower cost communication network with high reliability when compared to conventional slip rings. Further, this IR technology is simpler in structure to implement compared to glass fiber rotary joints, wireless transmission, GSM mobile transmission, inductive coupling and capacitive coupling techniques. Further, the IR technology advantageously protects the data communication link from damaging emi/emc effects.

According to one embodiment, at least one IR data communication element 56, 60, 62, 64, 66 comprises a single or multi-wavelength IR device such as, without limitation, an IR diode that is configured to allow passage of IR data signals through predetermined device surface contaminants. Such contaminants may include, without limitation, fog, smoke, snow and even dirt and/or dust. At least one IR data communication element may be configured with a super-hydrophobic coating to protect a predetermined IR device from foul weather elements such as icing and/or rain. The lens or optical aperture of one or more of the IR data communication elements may be enhanced to provide a harsher operating environment tolerant element and may be configured to better collimate the IR emission of an IR device such as an IR diode, or to focus a narrow spot size on a targeted area.

At least one IR data communication element 56, 60, 62, 64, 66 according to another embodiment comprises a single or multi-wavelength IR device configured with an active surface heater 72 to remove moisture from optical surfaces. The IR data communication element may further include independently or in addition to the active surface heater, a rotating surface wiper 74 to provide a dusting effect on occasional or a regular rotational schedule. A shroud can independently or additionally be added to ingress points (enumerated 76 in FIG. 2) in the pitch tube 24 to prevent solar blinding IR effects. Other embodiments may employ one or more single or multi-wavelength IR devices configured with a lens surface area to substantially fit the pitch tube signal area.

According to one embodiment, the apparatus further comprises an adaptive IR link power budget monitor/controller 80 such as depicted in FIG. 2 that is configured to control IR data signal power in response to predetermined IR data communication element conditions. These conditions include, without limitation, surface contaminant build-up, miss-alignment, device wear, elastomer mount wearout, and vibration.

According to one embodiment, rotary joint portion 41 includes microelectronics 80 integrated therein to control and enable usage of the IR diodes 56, 60, 62, 64, 66. The electronics is preferably located on the same circuit board as the IR diodes. Multiple functions can be achieved with the electronics, such as data integrity check via means of additional data protocols, adaptation to different bus interfaces (such as Ethernet, CANbus, USB), adaptation to different bus data rates, control of power consumption as mentioned above, or it could as well measure rotational speed. One basic function of the electronics 80 is to configure the electrical bus signal such that each diode produces suitable light pulses, and on the receiver side to amplify the signals and re-convert into suitable bus signals.

Infrared light as used in this application shall be understood to mean electromagnetic waves with wavelength in the range of 780 nm to 1 mm. The IR light may or may not be coherent light, as produced by laser light diodes commonly used for fiber optic cables or fiber optic rotary joints. One typical embodiment of the apparatus comprises standard IR diodes with non-coherent light.

Even if the wavelength of the light is in the same range as for fiber optic rotary joints, the differentiator is the targeted distance between emitter and receiver: Where fiber optic joints are commonly designed for very small distances in the range of a few millimeters, the application here is intended for distances up to decimeters or even meters. A typical embodiment of the IR data joint as depicted in FIG. 3 is designed for a distance between emitter and receiver in the range of centimeters.

While the invention has been described in terms of various specific embodiments, those skilled in the art will recognize that the invention can be practiced with modification within the spirit and scope of the claims.

What is claimed is:

1. An apparatus for enabling transmission of signals and data via a means of infrared (IR) light for a wind turbine, the apparatus comprising:

a rotary joint disposed between a non-rotating portion of a wind turbine and a rotatable wind turbine hub, wherein the rotary joint forms one portion of a low-voltage signal and data communication bus; and a plurality of IR data communication elements attached to the rotary joint and configured to provide unidirectional or bidirectional IR data and signal exchange via the low-voltage signal and data communication bus between the non-rotating portion of the wind turbine and the rotatable wind turbine hub in response to rotation of a rotating portion of the wind turbine, wherein the plurality of IR data communication elements communicate in the axial direction of the rotary joint, and further wherein the rotary joint comprises a rotating section and a stationary section, wherein the rotating section comprises at least one slot configured to receive at least one diode separator element extending from the stationary section toward the rotating section.

2. The apparatus according to claim 1, wherein the non-rotating portion comprises a non-rotating portion of a wind turbine nacelle.

3. The apparatus according to claim 1, wherein the rotating portion of the wind turbine comprises a pitch tube.

4. The apparatus according to claim 3, wherein at least one IR data communication element is configured to transmit or receive IR data signals along a central axis of the pitch tube.

5. The apparatus according to claim 4, wherein at least one IR data communication element is configured to transmit IR data signals along a path independent of the central axis of the pitch tube.

6. The apparatus according to claim 1, wherein the rotating portion of the wind turbine comprises the rotatable wind turbine hub.

7. The apparatus according to claim 1, wherein at least one IR data communication element comprises an IR-diode.

8. The apparatus according to claim 1, further comprising a data communication bus configured to communicate the bi-directional data between the non-rotating portion of the wind turbine-and the rotatable wind turbine hub.

9. The apparatus according to claim 1, wherein at least one IR data communication element comprises a single or multi-wavelength IR device configured to allow passage of IR data signals through predetermined device surface contaminants.

10. The apparatus according to claim 1, wherein at least one IR data communication element comprises a single or multi-wavelength IR device configured with an active surface heater to remove moisture from optical surfaces.

11. The apparatus according to claim 1, wherein at least one IR data communication element comprises a single or multi-wavelength IR device configured with a super-hydrophobic coating to protect a predetermined IR device from foul weather elements.

12. The apparatus according to claim 11 wherein the foul weather elements comprise at least one of ice and rain.

13. The apparatus according to claim 3, wherein at least one IR data communication element comprises a single or multi-wavelength IR device configured with a lens surface area to substantially fit the pitch tube signal area.

14. The apparatus according to claim 1, further comprising microelectronics configured to drive and operate the IR communication elements.

15. The apparatus according to claim 14, wherein the microelectronics are further configured to achieve one or more of a data integrity check via means of predetermined data protocols, adaptation to different bus interfaces selected from Ethernet, CANbus, and USB interfaces, adaptation to different bus data rates, control of IR power consumption, and measurement of rotational speed.

16. The apparatus according to claim 1, further comprising an adaptive IR link power budget monitor configured to control IR data signal power in response to predetermined IR data communication element conditions.

17. The apparatus according to claim 16, wherein the predetermined IR data communication elements conditions comprise at least one of surface contaminant build-up, missalignment, device wear, elastomer mount wearout, and vibration.

18. The apparatus according to claim 1, wherein the plurality of IR data communication elements comprise at least one receiver IR element spaced apart from at least one corresponding transmitter IR element at a distance greater than about 1 centimeter.

19. The apparatus according to claim 1, wherein the plurality of IR data communication elements are connected to at least one of a pitch tube, a main shaft, and the rotatable hub.

* * * * *

UNITED STATES PATENT AND TRADEMARK OFFICE

CERTIFICATE OF CORRECTION

PATENT NO. : 8,041,225 B2
APPLICATION NO. : 12/642981
DATED : October 18, 2011
INVENTOR(S) : Hemmelmann et al.

It is certified that error appears in the above-identified patent and that said Letters Patent is hereby corrected as shown below:

On the Face Page, in the Figure, for Tag “22”, delete “Garbox” and insert -- Gearbox --, therefor.

In Fig. 2, Sheet 2 of 3, for Tag “22”, delete “Garbox” and insert -- Gearbox --, therefor.

Signed and Sealed this
Third Day of January, 2012

David J. Kappos
*Director of the United States Patent and Trademark Office*